(12) United States Patent
Temblador et al.

(10) Patent No.: US 8,026,442 B2
(45) Date of Patent: Sep. 27, 2011

(54) FLEXIBLE CABLE WITH STRUCTURALLY ENHANCED OUTER SHEATH

(75) Inventors: Richard Temblador, Carrollton, GA (US); John R. Carlson, Newnan, GA (US); Mark D. Dixon, Carrollton, GA (US); Randy D. Kummer, Villa Rica, GA (US); Charles D. Mercier, Carrollton, GA (US)

(73) Assignee: Southwire Company, Carrollton, GA (US)

(*) Notice: Subject to any disclaimer, the term of this patent is extended or adjusted under 35 U.S.C. 154(b) by 115 days.

(21) Appl. No.: 12/484,737

(22) Filed: Jun. 15, 2009

(65) Prior Publication Data
US 2010/0314148 A1 Dec. 16, 2010

(51) Int. Cl.
*H01B 7/00* (2006.01)

(52) U.S. Cl. .......................................... 174/28

(58) Field of Classification Search .............. 174/24, 174/93, 28, 102 D
See application file for complete search history.

(56) References Cited

U.S. PATENT DOCUMENTS

| | | | | |
|---|---|---|---|---|
| 5,196,078 | A * | 3/1993 | Pote | 156/52 |
| 5,753,861 | A * | 5/1998 | Hansen et al. | 174/93 |
| 5,792,991 | A * | 8/1998 | Nolf | 174/92 |
| 6,131,658 | A * | 10/2000 | Minear | 166/250.01 |
| 6,245,999 | B1 * | 6/2001 | Costigan et al. | 174/74 A |
| 6,796,743 | B2 * | 9/2004 | Nothofer et al. | 405/183.5 |
| 6,982,384 | B2 * | 1/2006 | Hall et al. | 174/102 R |
| 2005/0184916 | A1 * | 8/2005 | Lyons et al. | 343/709 |
| 2008/0135288 | A1 * | 6/2008 | Taylor et al. | 174/74 A |

* cited by examiner

*Primary Examiner* — Chau Nguyen
(74) *Attorney, Agent, or Firm* — Gardere Wynne Sewell LLP

(57) ABSTRACT

A flexible cable including an outer sheath having an inner surface, the inner surface forming a channel to receive at least one conductor and a support member. At least one conductor and support member are positioned within the channel to substantially resist deformation of the outer sheath.

20 Claims, 4 Drawing Sheets

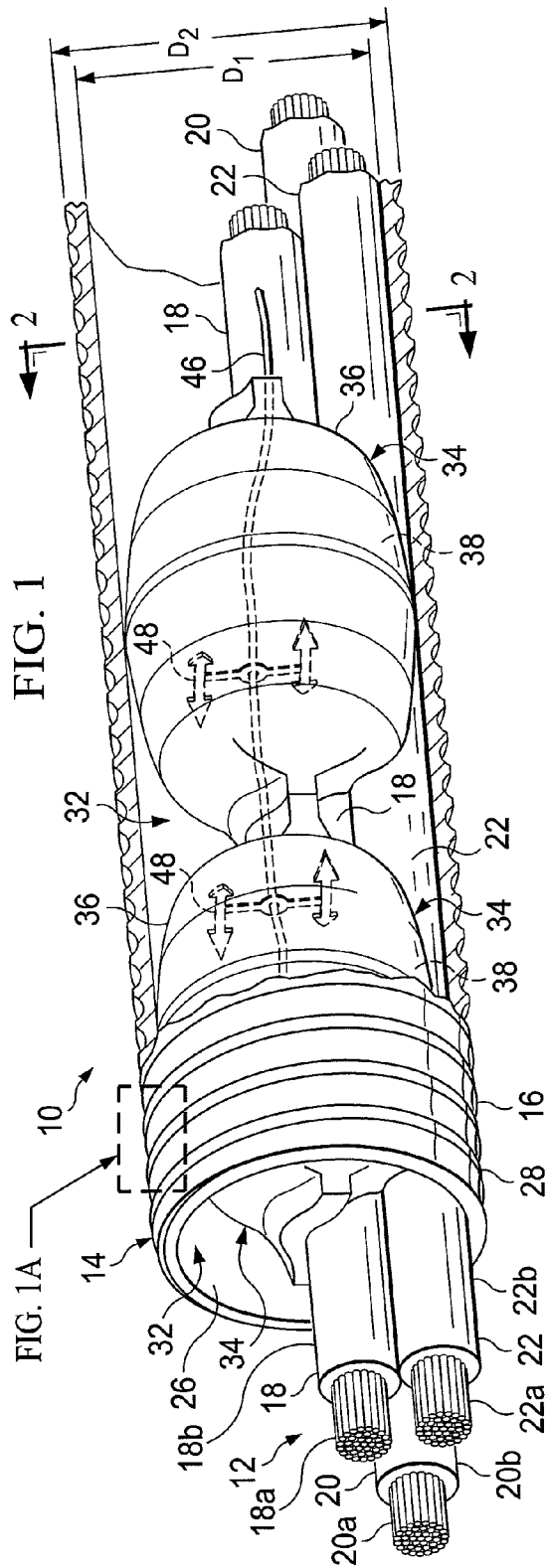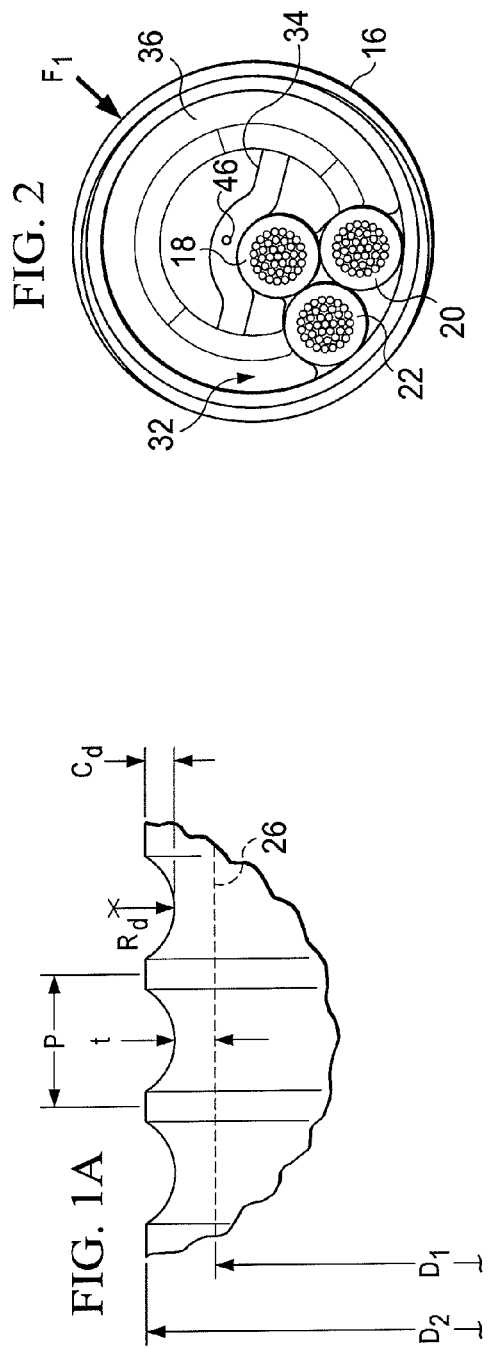

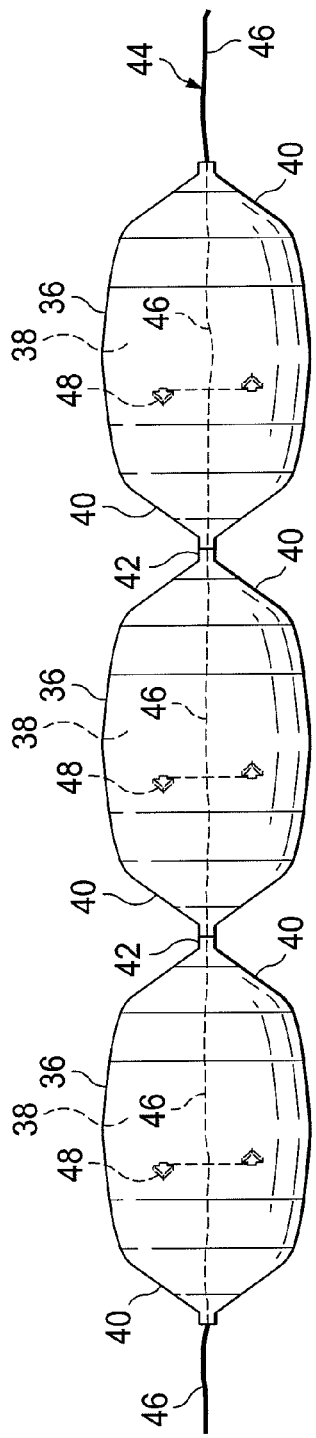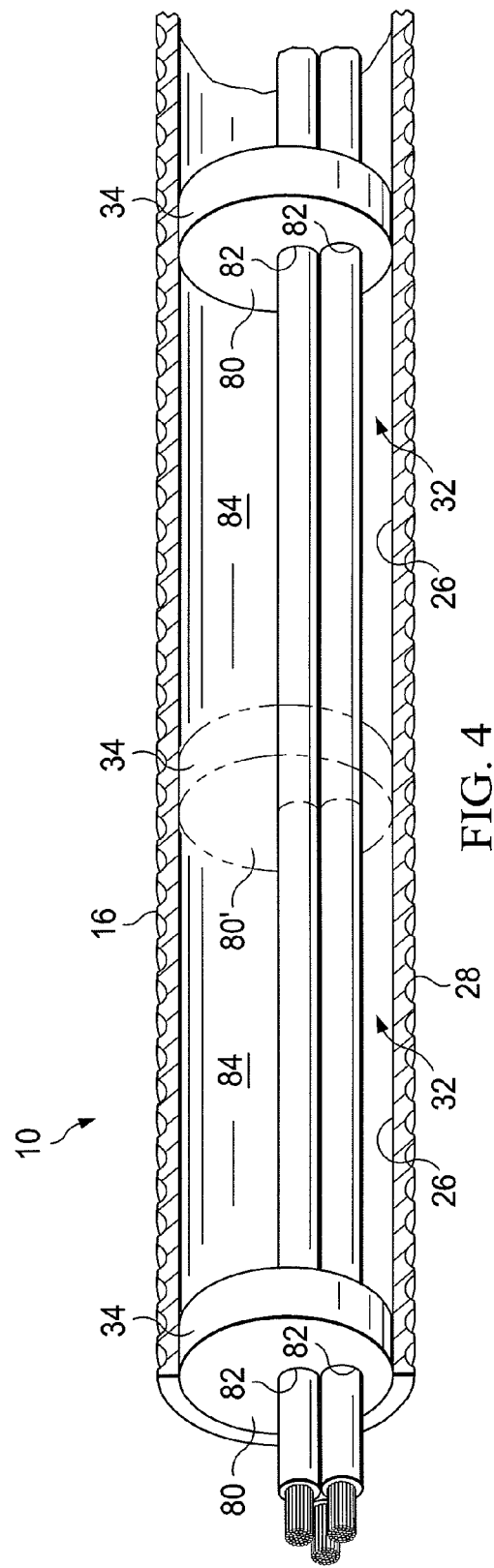

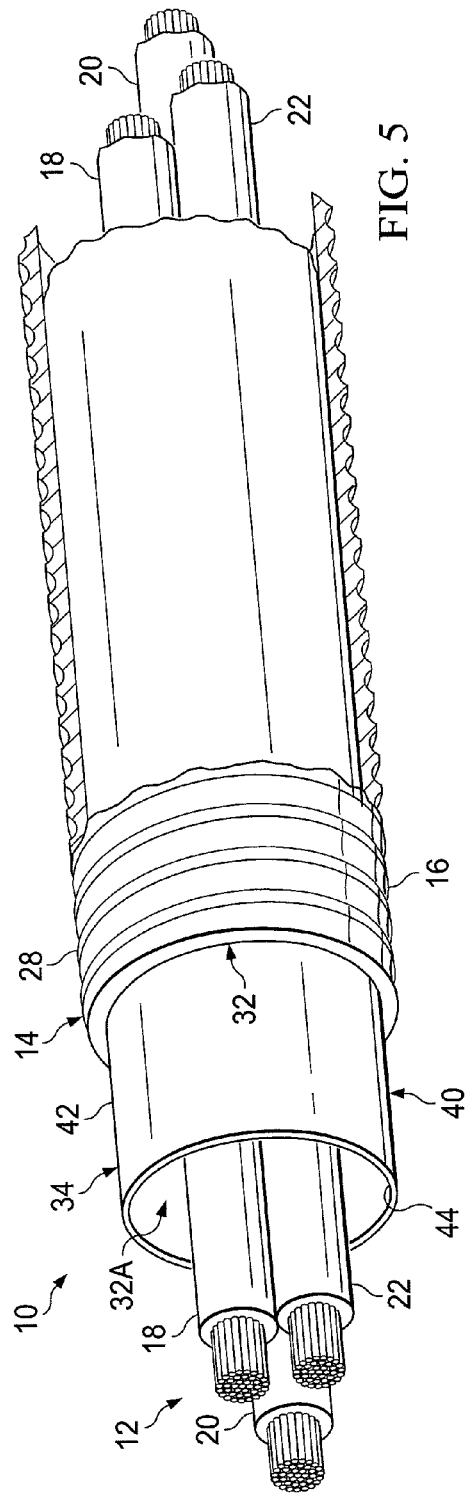
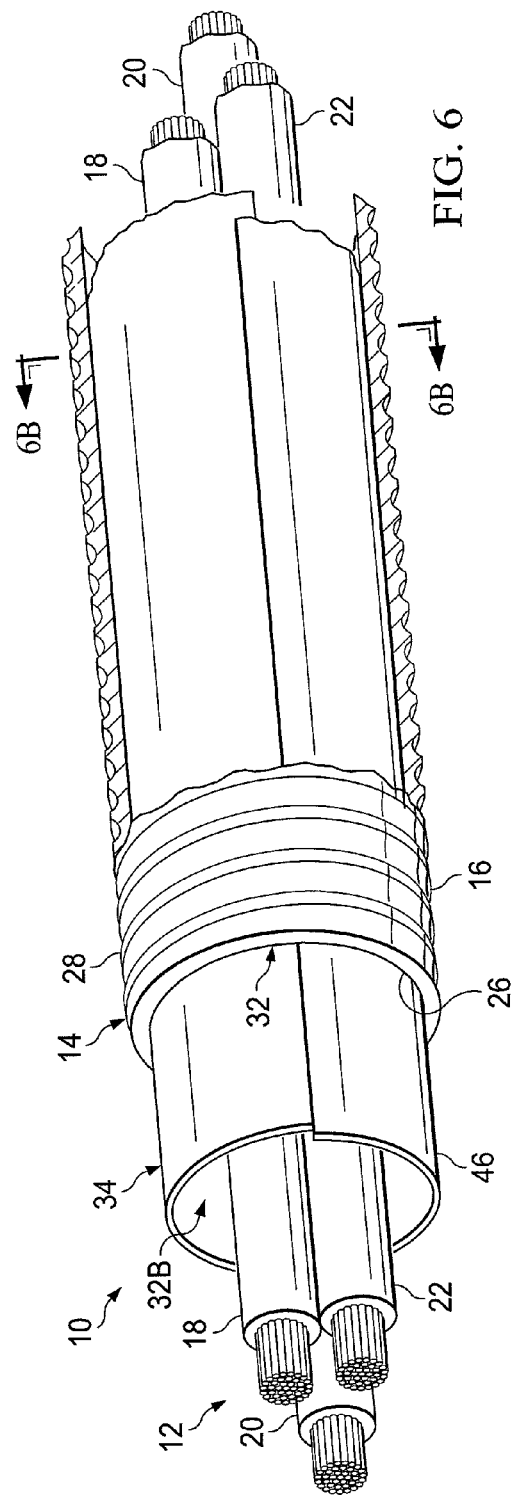

FLEXIBLE CABLE WITH STRUCTURALLY ENHANCED OUTER SHEATH

BACKGROUND

Rigid members such as conduit, pipe and tubing of standard trade sizes are oftentimes used for holding electrical conductors therein. For example, conduit sections are typically purchased from local stock, bent to the desired configuration and coupled together to form a channel for holding the conductors. However, using such rigid materials can be time consuming and cumbersome to install. Furthermore, while utilizing standard trade sizes enables conduit to be readily available through local stock, these standard trade sizes in many instances are not efficiently sized. For example, conduit that is larger than necessary results in material waste, increased weight and higher costs. Conversely, conduit that is too small can increase the likelihood of damage to the conductors during conductor installation and/or replacement within the conduit channel.

As an alternative, flexible cable with pre-installed conductors are oftentimes used in lieu of standard trade size rigid conduit or tubing in order to eliminate the tedious installation and inaccurate sizing as described above; however, such flexible cable configurations currently are not effective to enable easy removal and replacement of the conductors. While the outer jacket, sheath or armor can be sized to provide the requisite amount of free space or channel within the cable to facilitate removal and replacement of conductors, such flexible cable configurations are susceptible to damage during packing, shipping, installation, and/or removal and replacement of conductors since the outer sheath is provided with little or no support. For example, when a flexible cable is wound onto a storage reel, the weight of the cable can compromise and/or otherwise deform the cable's outer sheath thereby interfering with, and/or otherwise reducing the area of, the channel. This deformation can prevent and otherwise hinder the removal and replacement of the conductors within the flexible cable after it has been installed.

In addition, no effective methodology exists, other than utilizing trade size conduits or raceways, for increasing the size of the jacket, sheath or armor of a flexible cable to provide an adequately sized channel within the cable for removing and replacing the conductors contained within it. Moreover, with standard trade size conduits and raceways, the outer diameter or dimensions are fixed, which can limit available space to safely remove and replace the conductors or result in excessive or unnecessary space to safely remove and replace the conductors.

SUMMARY

In accordance with one aspect of the present invention, a flexible cable is provided including an outer sheath having an inner diameter and an outer diameter, the sheath forming a channel to receive at least one conductor along with a support member. The conductor(s) and support member are so positioned within the channel to substantially resist deformation of the outer sheath.

In accordance with another aspect, a new and improved method of manufacturing a flexible cable is provided in which the conductor(s) is enclosed. The outer sheath is particularly formed to resist deformation of the channel and facilitate removal and replacement of the conductor(s).

In accordance with yet another aspect of the present invention, a method of manufacturing a flexible cable comprises forming a flexible outer sheath to surround at least one conductor, wherein the formation of the outer sheath include forming a channel with an inner diameter sized such that the conductor(s) fills a predetermined cross-sectional area of the channel, with the inner and outer diameters sized to provide a configuration of the sheath to substantially resist deformation, thereby facilitating removal and replacement of the conductor(s) within the channel.

BRIEF DESCRIPTION OF THE DRAWINGS

For a more complete understanding of the present invention, including additional features, objects and advantages thereof, reference is now made to the following detailed description, taken in conjunction with the drawings, in which:

FIG. 1 is a diagram illustrating a reinforced flexible cable in which one or more conductors are employed to advantage;

FIG. 1A is an enlarged view of a region of the flexible cable of FIG. 1 indicated by the dashed box of FIG. 1;

FIG. 2 is a cross-sectional view of flexible cable of FIG. 1 taken along the line 2-2 in FIG. 1;

FIG. 3 is a diagram of illustrating a plurality of support members removed from the flexible cable;

FIG. 4 is a diagram illustrating an alternate embodiment of the flexible cable of FIG. 1 utilizing pressure seal plugs;

FIG. 5 is a diagram illustrating another alternate embodiment of the flexible cable of FIG. 1 utilizing a tubular support member; and FIGS. 6, 6A and 6B are diagrams illustrating another embodiment of the flexible cable of FIG. 1 utilizing a biased support member.

DETAILED DESCRIPTION

Figure 6A:
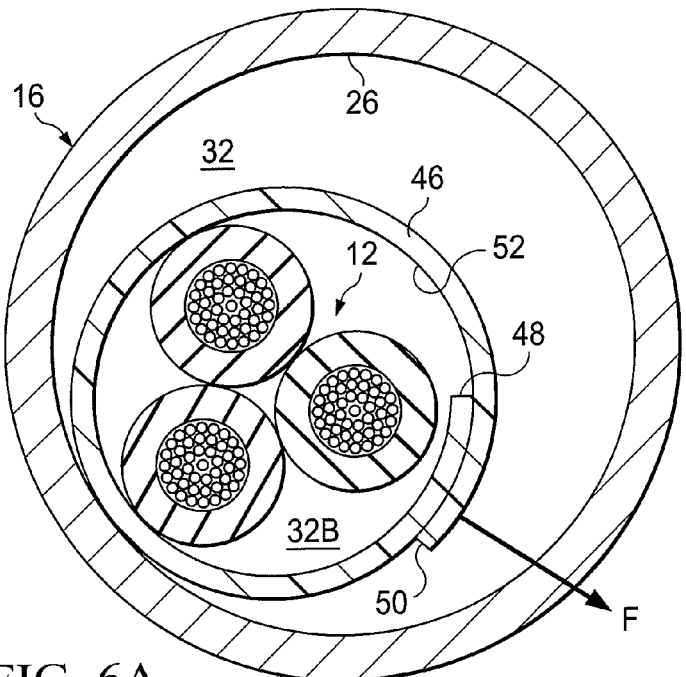

In the description which follows, like parts are marked throughout the specification and drawings with the same reference numerals, respectively. The drawings may not be to scale and certain features may be shown exaggerated in scale or in somewhat schematic form in the interest of clarity and conciseness.

FIG. 1 is a diagram illustrating a reinforced flexible cable 10 in which a pre-installed, removable and replaceable conductor assembly 12 is employed to advantage. In FIG. 1, flexible cable 10 comprises a metal-clad armored electrical cable 14 characterized by an outer sheath, jacket or armor 16 (hereinafter referred to as sheath 16) disposed around conductor assembly 12. In this embodiment, conductor assembly 12 comprises three elongated and flexible insulated electrical conductors 18 20 and 22 respectively formed of metallic wires 18a, 20a and 22a, within polymeric insulations or polymeric jackets 18b, 20b 22b. However, it should be understood that conductor assembly 12 may have a greater or fewer number of conductors depending on the type of cable and the particular application with which the cable 10 is to be used. According to the illustrated embodiment, sheath 16 is formed of a welded and corrugated metallic sheath; however, sheath 16 may be otherwise configured, such as, for example, helically wound (i.e., spiral) or annular (i.e., consecutive distinct rings). It should be understood that sheath 16 may be formed of any type of metallic or non-metallic material.

In the embodiment illustrated in FIGS. 1 and 1A, sheath 16 has a configuration defined by an inner surface 26 and an outer surface 28. The inner surface 26 defines an elongated channel 32 through which the conductor assembly 12 extends. The sheath 16 has between outer surface 28 and inner surface 26 a thickness "t" defined by inner diameter $D_1$ and outer diameter $D_2$. The configuration of sheath 16 is further defined by a pitch "P", a root diameter $R_d$, and a corrugation depth $C_d$, depending on the particular use and/or application. In the illustrated embodiment, thickness "t", pitch "P", root diameter "$R_d$" and/or corrugation depth "$C_d$", are sized to substantially reduce or eliminate deformation of sheath 16, and in particular, the inner surface 26, such deformation typically caused from manufacturing, packing, shipping and installation forces. Such reduction or elimination will enable the pre-installed conductor assembly 12 to be more easily removed from channel 32 and replaced with a new conductor assembly, when necessary. For example, a flexible cable 10 having a sheath 16 of corrugated welded tube may be sized such that the thickness "t" is approximately 0.04800 inches for a conductor assembly 12 having two conductors of a "12 AWG" wire size or a conductor assembly having four conductors of a "6 AWG" wire size. By way of an additional example, a flexible cable 10 having a helically wound sheath 16 may be sized such that the thickness "t" is approximately 0.04400 inches for a conductor assembly 12 having two conductors of a "12 AWG" wire size or three conductors of a "6 AWG" wire size. Alternatively, a flexible cable 10 having a helically wound sheath may have a configuration such that the $R_d$ is approximately 0.682 inches for a conductor assembly 12 including four wires of a "8 AWG" wire size, while a helically wound sheath may have a configuration such that the $R_d$ is approximately 0.475 inches for a conductor assembly 12 including four wires of a "12 AWG" wire size.

In addition to, or in lieu of, reducing the sheath deformation by maintaining the specific sheath configuration as just described, the flexible cable 10 may be provided with a support member 34, such as for example, one or more pressurized bladders 36, to provide additional stability and/or strength to sheath 16. Referring to FIGS. 1 and 2, each pressurized bladder 36 comprises a chamber 38 that is filled with a fluid/gas, such as for example, compressed air, such that when each bladder 36 is pressurized, each bladder 36 expands to fill channel 32 (i.e., the unfilled area around/above conductor assembly 12) so as to contact sheath inner surface 26. Thus, bladders 36 exert a force against inner surface 26 of sheath 16 to reduce and/or substantially eliminate the potential of deflection or deformation of sheath 16 caused by external forces. For example, in the event a force F1 (FIG. 2) acts on outer surface 28 during manufacturing, processing, handling or installation and/or from the weight of cable 10 when stored on a storage reel, bladders 36 and conductor assembly 12 act to resist force F1 to substantially reduce and/or eliminate deformation such as, for example, inward deformation of sheath 16, so as to maintain the integrity and shape of the channel 32, thus facilitating the removal and replacement of conductor assembly 12.

Referring again to FIG. 1, it will be seen that since flexible cable 10 includes a plurality of spaced apart bladders 36 disposed along the length of cable 10, if cable 10 is terminated/cut over a bladder 36, only a single exposed bladder 36 will be cut thereby enabling the remaining and uncut bladders 36 to continue to provide support to flexible cable 10. Therefore, while it is contemplated that a single, continuous bladder 36 extending the longitudinal dimension of the channel 32 will provide the advantages of this invention, by having spaced-apart bladders 36, cable 10 maintains optimal flexibility.

As a feature of the invention, the configuration of sheath 16 may be dependent upon a characteristic of conductor assembly 12. For example, if conductor assembly 12 comprises three or more conductors, sheath 16 may be sized such that the conductors and bladder 36, if present and deflated, provide a conductor fill ratio of, and/or otherwise consume, approximately forty percent (40%) of the cross-sectional area of channel 32. On the other hand, if conductor assembly 12 comprises two conductors, sheath 16 may be sized such that the conductors and bladder 36, when present and deflated, have a fill ratio and/or otherwise fill approximately thirty-one percent (31%) of the cross sectional area of channel 32. If conductor assembly 12 comprises a single conductor, sheath 16 may be sized such that the conductor and bladder 36, if present and deflated, should fill approximately fifty-three percent (53%) of the cross-sectional area of channel 32. Thus, when it is desired to remove and replace conductor assembly 12, an installer or technician can easily remove conductor assembly 12 along with the deflated bladders 36 and replace conductor assembly 12 with a new conductor assembly. It should be understood that because flexible cable 10 is presumed to be in the field when the conductor assembly 12 is replaced, pressurized bladders 36 are no longer necessary since flexible cable 10 will not be subjected to the typical forces associated with manufacturing, packing, installation and storage.

The conductor fill ratio can also be otherwise selected. In particular, sheath 16 can be sized to accommodate a differently sized/configured and subsequently installed conductor assembly 12, such as, for example, when the number and/or size of replacement conductors is different from the originally installed conductor assembly 12 (i.e., when it is desired to accommodate future growth). For example, sheath 16 may be originally sized to accommodate three conductors such that the conductors fill approximately 20 percent of the cross sectional area of channel 32. If conductor assembly 12 is removed and replaced with a differently configured conductor assembly 12, such as, for example, a conductor assembly having two additional conductors that consume an additional twenty percent cross sectional area, sheath 16 is sized to accommodate the increased number of conductors of new conductor assembly 12 without requiring a new sheath 16 since the conductor fill ratio is forty percent.

FIG. 3 is a diagram of illustrating a plurality inflatable bladders 36 removed from flexible cable 10. In FIG. 3, each bladder 36 comprises opposed extension members 40, which are fused, melted, welded or otherwise coupled together at joints 42 to connect adjacent bladders 36. In the embodiment illustrated in FIG. 3, a depressurization device 44 consisting of a barbed component 46 extends through chambers 38 of successive bladders 36. Thus, when it is desired to remove conductor assembly 12, barbed component 46 is pulled such that barbs 48, disposed on component 46 within bladder 36, punctures the bladder sidewall to deflate each bladder 36. Additionally or alternatively, the component 46 of depressurization device 44 may be an electrically conductive wire such that when a current is applied, the wire 46 melts bladders 36 to facilitate their deflation. When installed within cable 10 and once deflated, conductor assembly 12 is easily removable from channel 32. Each bladder 36 may be formed of any type of elastic material, such as, for example, rubber or latex, such that when pressurized with compressed air, bladder 36 expands to conform to the inner surface 26 of sheath 16 to provide internal support for the wall of flexible cable 10, thereby preventing its collapse. Bladder 36 may be formed at least partially from a material, or contains an outer coating or jacket, that acts to reduce installation force required for linear displacement within the channel 32.

FIG. 4 is a diagram illustrating another embodiment of the flexible cable 10, in which the support member 34 includes pressure seal plugs 80. In FIG. 4, pressure seal plugs 80 are disposed at respective ends of cable 10 and are configured to cap or otherwise enclose channel 32 to enable channel 32 to be pressurized with, for example, an inert gas, in order to provide the required additional strength to the sheath 16 to resist deformation during the manufacturing, packing, storage and/or installation steps. In the embodiment illustrated in FIG. 4, pressure seal plugs 80 are inflatable and comprise one or more internal openings 82 corresponding to the number of conductors in conductor assembly 12. The pressure seal plugs 80 may be otherwise configured, such as, for example, a solid rubber member appropriately sized to receive the respective conductors of conductor assembly 12, while also forming a sealed connection with inner surface 26 of sheath 16.

When forming the flexible cable 10 of FIG. 4, channel 32 is pressurized with compressed air, and pressure seal plugs 80 are disposed on respective ends of cable 10 to seal channel 32. Accordingly, when channel 32 is pressurized, the internal pressure acts to resist any external forces acting on cable 10, thereby reducing or substantially eliminating the deformation of the wall of sheath 16 that might otherwise occur. As with the other embodiments, the integrity of channel 32 facilitates removal and replacement of conductor assembly 12.

In lieu of providing pressure seal plugs 80 solely at respective ends of cable 10, one or more pressure seal plugs 80' may also be disposed at spaced apart intervals within channel 32, as illustrated in phantom in FIG. 4. In addition to resisting any forces acting on outer surface 28, the plugs create spaced apart pressure chambers 84 such that when an inert gas is contained within each of the pressure chambers 84, the pressure chambers 84 also act to provide an outwardly directed radial force on sheath 16 to resist inward deflection of sheath 16. Furthermore, by having pressure chambers 84 strategically spaced, in the event cable 10 is terminated/cut directly through a pressure chamber 84, the remaining pressure chambers 84 remain unaffected.

FIG. 5 is a diagram illustrating an alternate embodiment of flexible cable 10 of FIG. 1 in which the support member 34 is a tubular member 40. In the embodiment illustrated in FIG. 5, tubular member 40 is disposed within channel 32 and is sized such that an outer surface 42 of member 40 abuts or is otherwise positioned near or adjacent to inner surface 26 of sheath 16 to prevent or substantially resist deformation of sheath 16. In the embodiment illustrated in FIG. 5, tubular member 40 defines a channel 32A sized to receive conductor assembly 12, and has a generally smooth inner surface 44 to facilitate removal and replacement of conductor assembly 12. In one form, tubular member 40 has a wall thickness of between 0.080 to 0.090 inches so as to be sufficiently bendable while also providing adequate strength to resist deformation of sheath 16. It should be understood, however, that the outer wall of tubular member 40 may have a greater or smaller thickness, depending on the particular application with which tubular member 40 is being used. Tubular member 40 may be fabricated by any number of processes and of any number of materials, but is preferably formed by extrusion and is of a polymeric material such as, but not limited to, polyvinylchloride (PVC).

Figure 6B:
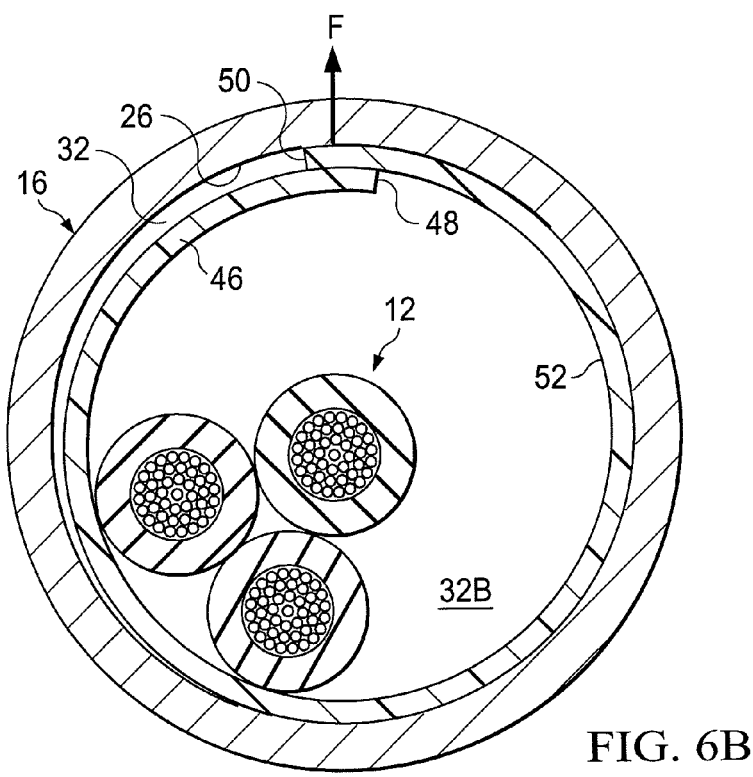

FIGS. 6, 6A and 6B are diagrams illustrating another alternate embodiment of the flexible cable 10 of FIG. 1 in which the support member 34 comprises an outwardly biased member 46. Member 46 is rolled or otherwise formed into a generally tubular shape defining a channel 32B and including first and second edges 48 and 50, respectively, and generally biased from a collapsed position (FIG.6A) to an expanded position (FIG. 6B). The member 46 is thus configured such that the first and second edges 48 and 50 both provide an outward radial force F to enable member 46 to support and/or otherwise conform to the inner surface 26 of the sheath 16 preventing and/or substantially resisting deformation of sheath 16.

As illustrated in FIGS. 6, 6A and 6B, member 46 is sized so as to receive conductor assembly 12 therein and has a generally smooth inner surface 52 to facilitate removal and replacement of conductor assembly 12. The wall thickness of member 46 comprises a thickness of between 0.080 to 0.090 inches to enable member 46 to be sufficiently bendable while also providing adequate strength to resist deformation of sheath 16. It should be understood, however, that member 46 may have a greater or smaller wall thickness, depending on its particular application while member 46 may be formed of other material, possibly of a Nylon or polymeric material.

As an additional feature, members 40 and 46, respectively, shown in FIGS. 5 and 6, may be formed so that their inner and outer surfaces have increased lubricity so as to reduce the force required to install and remove the cable assembly 12 in and from the channel 32A and 32B, respectively, as well as to facilitate the positioning of the particular support member 34 within the cable sheath 16. This increased lubricity may be effected, for example, by depositing a layer of lubricating material upon the inner and outer surfaces of the members 40 and 46, or by extruding the members 40 and 46, during which the appropriate lubricant may be introduced in accordance with the process described in U.S. Pat. No. 7,411,129, specifically column 2, lines 28-42, and column 3, lines 51-67, thereof, which description is incorporated by reference herein. Any lubricant may be used that is compatible with the other material of the members 40 and 46, examples of potential lubricants also being described in U.S. Pat. No. 7,411,129, particularly at column 2, lines 43-67, and column 3, lines 1-10, thereof, which lubricant descriptions are also incorporated by reference herein.

Although specific embodiments have been described in detail, those skilled in the art will also recognize that various substitutions and modifications may be made without departing from the scope and spirit of the appended claims.

What is claimed is:

1. A flexible cable comprising:
   an outer sheath having an inner surface, the inner surface forming a channel to receive at least one conductor and at least one pressurized bladder to substantially resist deformation of the outer sheath; and
   a depressurization mechanism comprising a barbed component to deflate the pressurized bladder.

2. The flexible cable of claim 1, wherein the outer sheath comprises a metal armor.

3. The flexible cable of claim 1, further comprising a plurality of spaced apart pressurized bladders to resist deformation of the outer sheath.

4. The flexible cable of claim 3, wherein the plurality of spaced apart pressurized bladders form a pressure chamber therebetween.

5. The flexible cable of claim 1, wherein the at least one conductor and the at least one pressurized bladder, when de-pressurized, fill a predetermined portion of the cross-sectional area of the channel.

6. The flexible cable of claim 1, wherein the at least one conductor and the pressurized bladder, when de-pressurized, fill about forty percent (40%) of the cross-sectional area of the channel.

7. The flexible cable of claim 1, wherein the channel is sized to facilitate removal of the at least one conductor and the at least one pressurized bladder and insertion of a new at least one conductor.

8. The flexible cable of claim 1, wherein the at least one pressurized bladder comprises a pressurized bladder disposed on respective ends of the flexible cable.

9. The flexible cable of claim 1, wherein the at least one pressurized bladder is inflatable so as to contact an inner surface of the channel to provide support thereto.

10. The flexible cable of claim 1, wherein the at least one pressurized bladder comprises a lubricating material.

11. A flexible cable comprising:
   an outer sheath having an inner surface, the inner surface forming a channel to receive at least one conductor and at least one pressurized bladder to substantially resist deformation of the outer sheath; and
   a depressurization mechanism comprising an electrically conductive wire to deflate the pressurized bladder.

12. The flexible cable of claim 11, wherein the outer sheath comprises a metal armor.

13. The flexible cable of claim 11, further comprising a plurality of spaced apart pressurized bladders to resist deformation of the outer sheath.

14. The flexible cable of claim 13, wherein the plurality of spaced apart pressurized bladders form a pressure chamber therebetween.

15. The flexible cable of claim 11, wherein the at least one conductor and the at least one pressurized bladder, when de-pressurized, fill a predetermined portion of the cross-sectional area of the channel.

16. The flexible cable of claim 11, wherein the at least one conductor and the pressurized bladder, when de-pressurized, fill about forty percent (40%) of the cross-sectional area of the channel.

17. The flexible cable of claim 11, wherein the channel is sized to facilitate removal of the at least one conductor and the at least one pressurized bladder and insertion of a new at least one conductor.

18. The flexible cable of claim 11, wherein the at least one pressurized bladder comprises a pressurized bladder disposed on respective ends of the flexible cable.

19. The flexible cable of claim 11, wherein the at least one pressurized bladder is inflatable so as to contact an inner surface of the channel to provide support thereto.

20. The flexible cable of claim 11, wherein the at least one pressurized bladder comprises a lubricating material.

\* \* \* \* \*